US008643917B2

United States Patent
Ishida

(10) Patent No.: US 8,643,917 B2
(45) Date of Patent: *Feb. 4, 2014

(54) LIGHT PROJECTION UNIT, IMAGE READING DEVICE INCLUDING SAME, AND IMAGE FORMING APPARATUS INCLUDING THE IMAGE READING DEVICE

(71) Applicant: Masatoshi Ishida, Kawasaki (JP)

(72) Inventor: Masatoshi Ishida, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,759

(22) Filed: Nov. 27, 2012

(65) Prior Publication Data
US 2013/0083345 A1 Apr. 4, 2013

Related U.S. Application Data

(63) Continuation of application No. 12/659,605, filed on Mar. 15, 2010, now Pat. No. 8,422,093.

(30) Foreign Application Priority Data

Mar. 16, 2009 (JP) .................................. 2009-063189

(51) Int. Cl.
H04N 1/04 (2006.01)

(52) U.S. Cl.
USPC ........... 358/475; 358/509; 358/505; 362/551; 399/144

(58) Field of Classification Search
USPC .......... 358/474, 575, 509, 501, 505; 362/610, 362/551; 399/144
See application file for complete search history.

(56) References Cited

U.S. PATENT DOCUMENTS

| 7,088,477 | B2 | 8/2006 | Koshimizu et al. | |
|---|---|---|---|---|
| 7,275,853 | B2 * | 10/2007 | Kano et al. | 362/620 |
| 7,430,358 | B2 * | 9/2008 | Qi et al. | 385/146 |
| 7,455,441 | B2 * | 11/2008 | Chosa et al. | 362/608 |
| 7,492,346 | B2 * | 2/2009 | Manabe et al. | 345/102 |
| 7,495,682 | B2 | 2/2009 | Kohchi | |
| 7,550,714 | B2 | 6/2009 | Amano | |

(Continued)

FOREIGN PATENT DOCUMENTS

| JP | 04-018771 | 1/1992 |
|---|---|---|
| JP | 2006-349807 | 12/2006 |
| JP | 2008-172564 | 7/2008 |

OTHER PUBLICATIONS

U.S. Notice of Allowance mailed Dec. 14, 2012 in U.S. Appl. No. 12/659,605.

*Primary Examiner* — Negussie Worku
(74) *Attorney, Agent, or Firm* — Harness, Dickey & Pierce, P.L.C.

(57) ABSTRACT

A light projection unit includes a substrate, a plurality of light emitting elements arrayed on the substrate in a main scanning direction and including light emitting surfaces, a light guide facing the light emitting surfaces to direct light projected from the light emitting elements onto an illumination target and including a first positioning portion, and a holder including a second positioning portion that engages the first positioning portion of the light guide to position the light guide on the holder. The first positioning portion of the light guide is positioned between centers of light emission of adjacent light emitting elements in the main scanning direction of the substrate when the first positioning portion engages the second positioning portion of the holder.

10 Claims, 12 Drawing Sheets

(56) References Cited

U.S. PATENT DOCUMENTS

| | | |
|---|---|---|
| 7,760,403 B2 * | 7/2010 | Sakurai .................. 358/484 |
| 7,884,976 B2 | 2/2011 | Minobe et al. |
| 7,903,298 B2 | 3/2011 | Sawada et al. |
| 7,940,433 B2 | 5/2011 | Onishi et al. |
| 8,144,088 B2 * | 3/2012 | Manabe et al. ............ 345/84 |
| 8,218,205 B2 | 7/2012 | Nagatani et al. |
| 8,310,737 B2 * | 11/2012 | Nagao et al. .............. 358/475 |
| 8,422,093 B2 * | 4/2013 | Ishida ...................... 358/475 |
| 2006/0007417 A1 | 1/2006 | Tatsuno |
| 2006/0008295 A1 | 1/2006 | Kohchi |
| 2006/0279961 A1 | 12/2006 | Sakurai |
| 2010/0232834 A1 * | 9/2010 | Ishida ...................... 399/144 |

* cited by examiner

LIGHT PROJECTION UNIT, IMAGE READING DEVICE INCLUDING SAME, AND IMAGE FORMING APPARATUS INCLUDING THE IMAGE READING DEVICE

CROSS-REFERENCE TO RELATED APPLICATIONS

This application is a continuation application of and claims priority under 35 U.S.C. §120/121 to U.S. application Ser. No. 12/659,605 filed Mar. 15, 2010, which claims priority under 35 U.S.C. §119 to Japanese Patent Application No. 2009-063189 filed on Mar. 16, 2009 in the Japan Patent Office, the contents of each of which are hereby incorporated herein by reference in their entirety and for all purposes.

BACKGROUND OF THE INVENTION

1. Field of the Invention

Exemplary aspects of the present invention generally relate to a light projection unit, an image reading device using the same, and an image forming apparatus using the image reading device.

2. Description of the Background Art

Conventionally, there is known an image reading device that employs a light source that illuminates a surface of a document and an image pickup device, such as a charge coupled device (CCD) or a complementary metal oxide semiconductor (CMOS), which receives reflected light from the document surface. An image on the document surface is read based on the reflected light from the document surface received by the image pickup device.

Typically, an image reading device that reads the document placed on a contact glass is equipped with a light projecting device. The light projecting device includes a carriage including a light source that moves along the contact glass while illuminating the document with light from the light source.

One example of a related-art light projecting device including the light source also includes a light guide made of translucent material disposed between the light source and the document. The light guide reflects and concentrates light radially emitted from the light source, which consists of a plurality of LEDs arrayed in a main scanning direction, onto a light emitting surface of the light guide. The advantage of such a configuration is that, even if the luminous intensity of the LEDs is relatively weak, light with high intensity can still be projected onto the document surface.

Ultimately, it is desirable to have as much of the light projected from the LEDs as possible to enter the light guide. Further, it is desirable to project as much of the light incident upon the light guide as possible onto an illumination target. Accomplishing these goals requires accurate positioning of the light source and the light guide both relative to each other and to the illumination target.

In the related-art light projecting device, the plurality of LEDs is arrayed on a substrate, hereinafter referred to as an LED array substrate. The light guide is fixed to the LED array substrate by double-sided tape or an adhesive agent. However, the light projecting device is not equipped with a mechanism to properly position the light guide relative to the LED array substrate. Thus, it is difficult to fix the light guide to the LED array substrate with precision.

In order to facilitate an understanding of the related art and of the novel features of the present invention, a description is now provided of an example of a related-art positioning mechanism for positioning the light guide, with reference to FIGS. 15 and 16. FIG. 15 is a schematic diagram illustrating one example of a related-art light projecting device. FIG. 16 is an explanatory diagram for explaining light paths of projected light.

As illustrated in FIG. 15, a holding member 605 is provided to hold the LED array substrate 691 and the light guide 603. As illustrated in FIGS. 15 and 16, the holding member 605 is longer than a document area F in the main scanning direction, in order to accommodate positioning holes 604a for positioning the light guide 603 formed at both ends of the holding member 605 outside the document area F.

The light guide 603 is also longer than the document area F in the main scanning direction. Positioning bosses 604 that engage the positioning holes 604a are formed at both ends of the light guide 603 outside the document area F. The light guide 603 is positioned by fitting the positioning bosses 604 into the positioning holes 604a.

Although advantageous, there is a drawback to this configuration. As illustrated in FIG. 16, although only one end portion of the light guide 603 is illustrated, it can be seen that the end portions of the light guide 603 are separated apart from the end portions of the document area F. As a result, of all the light incident upon the light guide 603 from the LED 692 at the end portion of the LED array substrate 691 in the main scanning direction, that part of the incident light which is not headed to the document area F is uselessly projected outside the document area F as indicated by a broken-line circle X1, which is undesirable.

Consequently, of the light projected from the LED 693 at the end portion of the LED substrate 961 and incident upon the light guide 603 only the light heading toward the document area F shown by a solid-line circle Z1 is properly projected toward the document area F, while light intensity at the end portions of the document area F remains insufficient.

To correct this problem, it is preferable that the length of the light guide be substantially the same as that of the document area F. If the length of the light guide 603 in the main scanning direction is substantially the same as that of the document area F, the end portions of the document area F and both ends of the light guide 603 can be aligned as closely as possible. Such a configuration is illustrated in FIG. 17.

With this configuration, as illustrated in FIG. 17, of the light incident upon light guide 603 from the LED 692 at the end portions of the LED array substrate 691 in the main scanning direction, the incident light that is not headed to the document area F can still be directed toward the document area F as indicated by a broken-line circle X2. Accordingly, the light totally reflected from a side surface 603c of the light guide 603, indicated by the broken-line circle X2, can illuminate the document area F, in addition to the light directed toward the document area F indicated by the circle Z1, thereby reliably securing a sufficient amount of light at the end portions of the document area F.

When both end portions of the light guide 603 are aligned with the end portions of the document area F, the positioning bosses 604 need to be provided at places corresponding to the document area F. However, there is a drawback in this approach in that internal reflection does not occur in the positioning bosses 604, for the following reasons.

The light guide 603 is formed of resin, for example acryl, that is molded. The mold is mirror-finished so that the surface of the light guide 603 also has a mirror-like surface. However, a mirror finish cannot be given to the mold where the positioning bosses 604 are formed because these areas of the mold are depressed portions, that is, concavities. Consequently, a mirror finish cannot be given to the light guide 603. Furthermore, an incident angle of the incident light in the positioning bosses 604 is smaller than a critical angle. For these reasons, the light incident upon the positioning bosses 604 is not internally reflected but leaks out of the positioning bosses 604. As a result, the distribution of light over the document surface in the main scanning direction becomes significantly uneven.

SUMMARY OF THE INVENTION

In view of the foregoing, in one illustrative embodiment of the present invention, a light projection unit includes a substrate, a plurality of light emitting elements, a light guide, and a holder. The plurality of light emitting elements is arrayed on the substrate in a main scanning direction. Each of the light emitting elements includes a light emitting surface from which light is projected. The light guide is disposed facing the light emitting surfaces of the light emitting elements and directs light projected from the light emitting elements onto an illumination area of an illumination target. The light guide includes a first positioning portion. The holder includes a second positioning portion that engages the first positioning portion of the light guide and positions the light guide on the holder. The first positioning portion of the light guide is positioned between centers of light emission of adjacent light emitting elements in the main scanning direction of the substrate when the first positioning portion engages the second positioning portion of the holder.

In another illustrative embodiment of the present invention, an image reading unit includes the light projection unit to project light against a surface of a document and an image reading device to receive the reflected light from the document to read an image on the surface thereof.

Yet in another illustrative embodiment of the present invention, an image forming apparatus includes the image reading unit and an image forming device. The image forming device includes an image bearing member, a developing device, a transfer device, and a fixing device. The image bearing member bears an electrostatic latent image on a surface thereof. The developing device develops the electrostatic latent image formed on the image bearing member using toner to form a toner image. The transfer device transfers the toner image onto the recording medium. The fixing device fixes the toner image. The image forming apparatus forms the image with the image forming device based on image information read by the image reading device.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
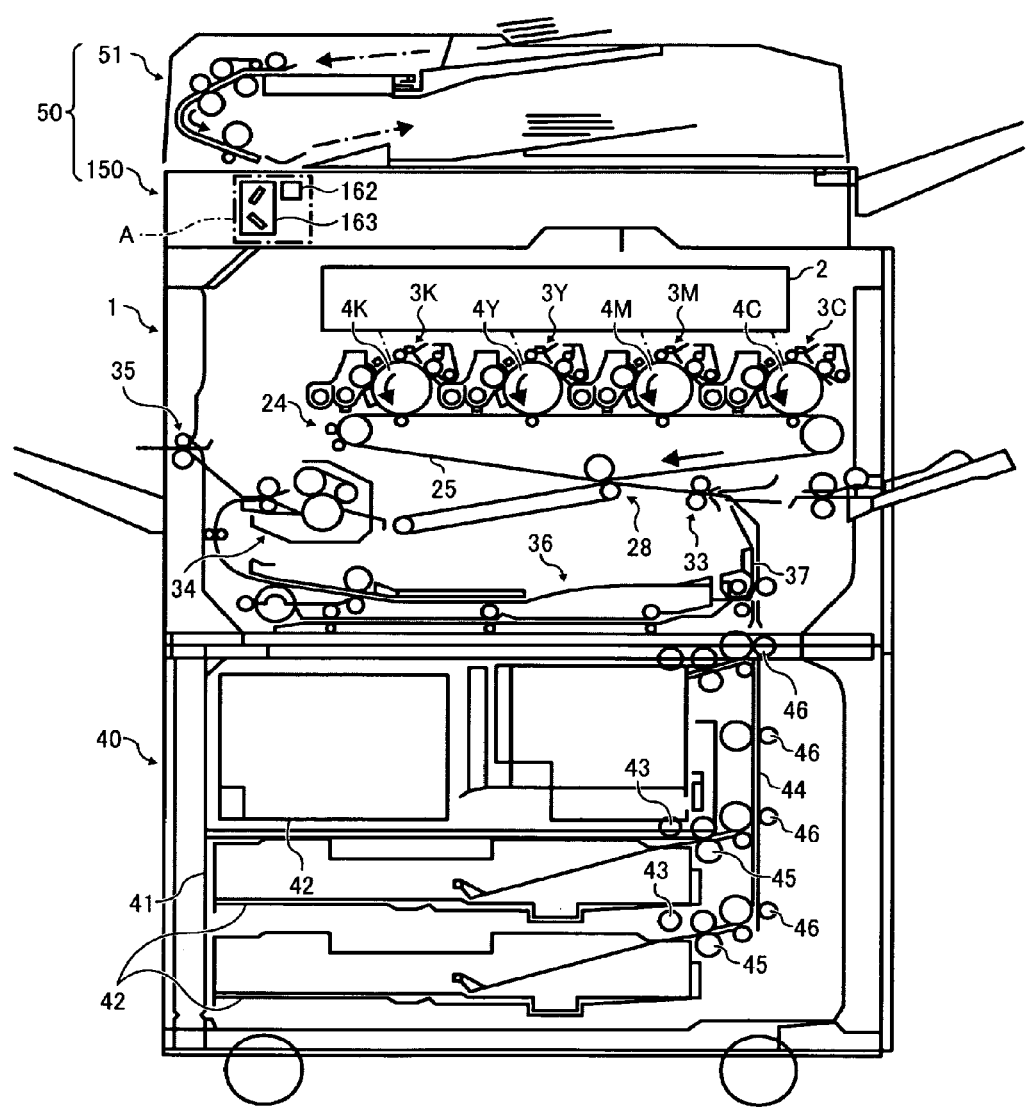
FIG. 1 is a schematic diagram illustrating an image forming apparatus according to an illustrative embodiment of the present invention.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, one example of an electrophotographic image forming apparatus using according to an illustrative embodiment of the present invention is described.

Referring now to FIG. 1, there is provided a schematic diagram illustrating an image forming apparatus. The image forming apparatus includes an image forming station 1, a sheet feeding unit 40, and a document reading unit 50. The document reading unit 50 includes an image reading device (scanner) 150 and an automatic document feeder (hereinafter referred to as ADF) 51. The image reading device 150 is fixed on the image forming station 1. The ADF 51 serves as a document transport device and is supported by the image reading device 150.

The sheet feeding unit 40 includes two sheet feed cassettes 42 each of which is provided with a pick-up roller 43 and a separation roller 45. In the sheet feeding unit 40, a plurality of sheet transport rollers 46 are disposed along a sheet transport path 44 and transport the recording medium to a sheet transport path 37 in the image forming station 1. The pick-up roller 43 picks up a recording medium from the sheet feed cassette 42. The separation roller 45 separates and supplies the recording medium to the sheet transport path 44.

The image forming station 1 includes an optical writing unit 2, four process units 3K, 3Y, 3M, and 3C, a transfer unit 24 including an intermediate transfer belt 25, a sheet transport unit 28, a pair of registration rollers 33, a fixing device 34, a pair of sheet discharge rollers 35, a switchback unit 36, a sheet transport path 37, and so forth.

A light source such as a laser diode and an LED, not illustrated in FIG. 1, disposed in the optical writing unit 2 projects a light beam against photoreceptor drums 4K, 4Y, 4M, and 4C of the process units 3K, 3Y, 3M, and 3C. When the light beam is projected, electrostatic latent images are formed on the surfaces of the photoreceptor drums 4K, 4Y, 4M, and 4C. Subsequently, the electrostatic latent images are developed with respective color of toner, thereby forming visible images, also known as toner images.

It is to be noted that reference characters K, Y, M, and C denote colors black, yellow, magenta, and cyan, respectively.

The toner images formed on the photoreceptor drums 4K, 4Y, 4M, and 4C are primarily overlappingly transferred onto the intermediate transfer belt 25 that endlessly rotates in a clockwise direction. At the primary transfer, toner images of four different colors are overlappingly transferred onto the intermediate transfer belt 25, thereby forming a composite color toner image.

The recording medium fed from the sheet feeding unit 40 is sent to a secondary transfer nip between the sheet transport unit 28 and the intermediate transfer belt 25 at appropriate timing by the pair of the registration rollers 33 such that the recording medium is aligned with the composite color toner image on the intermediate transfer belt 25. Accordingly, the composite color toner image on the intermediate transfer belt 25 is secondarily transferred onto the recording medium.

After passing through the secondary transfer nip, the recording medium is separated from the intermediate transfer belt 25 and transported to the fixing device 34. Pressure and heat are applied to the recording medium in the fixing device 34 so that the composite color toner image is fixed onto the recording medium. After the image is fixed on the recording medium, the recording medium is discharged from the fixing device 34 to the pair of the sheet discharge rollers 35. The recording medium is discharged out of the image forming apparatus.

Figure 2:
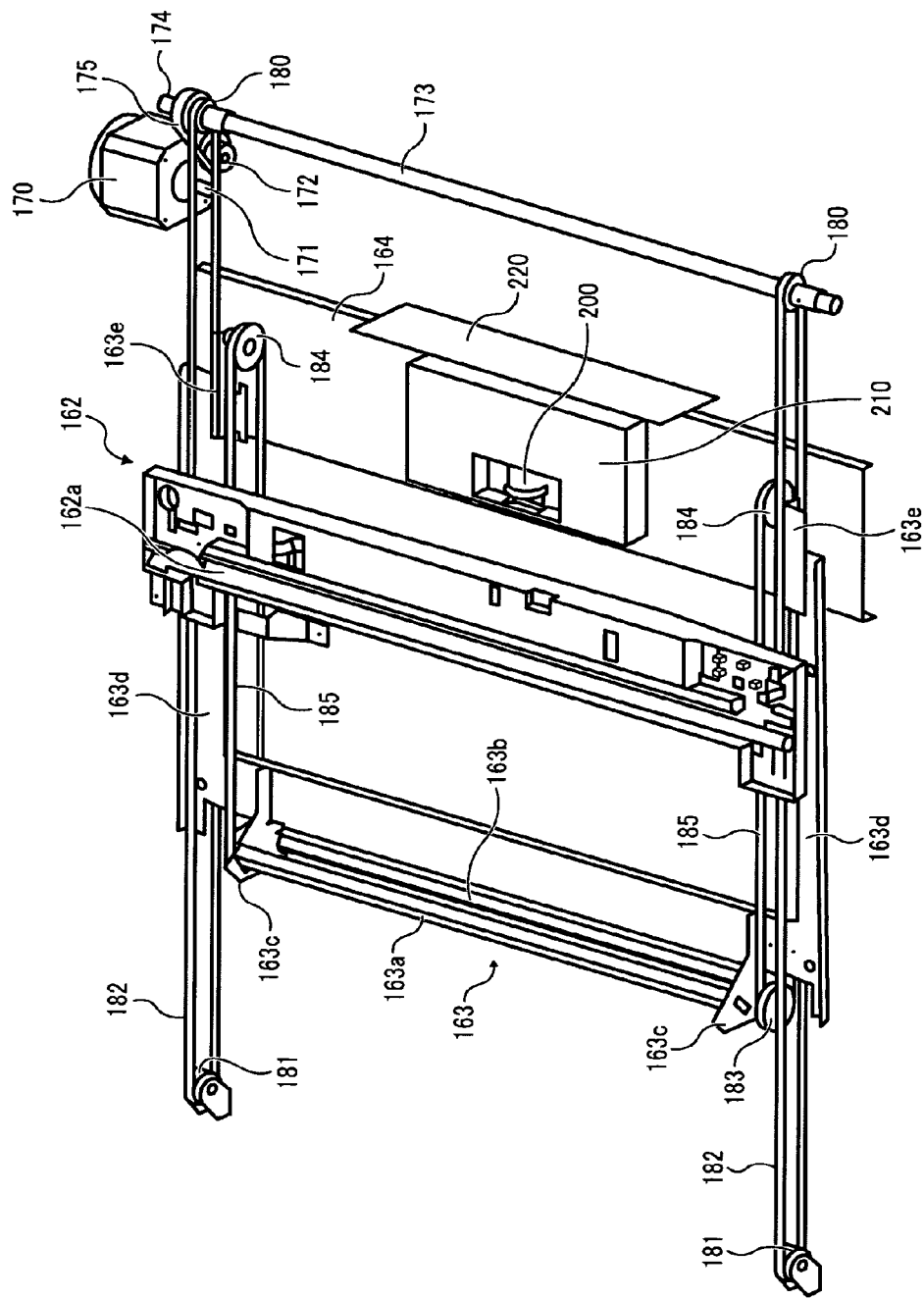
FIG. 2 is a partially enlarged perspective view of an image reading device of the image forming apparatus of FIG. 1.

As illustrated in FIG. 2, the image reading device 150 on the image forming station 1 includes a first carriage 162 and a second carriage 163. The first carriage 162 and the second carriage 163 are disposed under a contact glass, not illustrated, which is fixed to a roof of a casing of the image reading device 150 to contact the document.

The first carriage 162 includes a light source, a reflective mirror, and so forth. The second carriage 163 includes a reflective mirror and the like.

When reading an image on the document transported by the ADF 51, the first carriage 162 and the second carriage 163 move to a position A in FIG. 1 and stay still. While the first carriage 162 and the second carriage 163 stay still, light projected from the light source is reflected on the document traveling on the contact glass transported by the ADF 51. A CCD serving as an image pick up device reads the reflected light via a plurality of reflective mirrors, thereby reading the image on the document.

By contrast, when reading an image of a document placed on the contact glass, the first carriage 162 and the second carriage 163 are moved from the left to the right in FIG. 1. As the first carriage 162 and the second carriage 163 are moved from the left to the right, the light projected from the light source is reflected from the document placed on the contact glass. The CCD reads the reflected light via the plurality of the reflective mirrors and an imaging lens.

Figure 3:
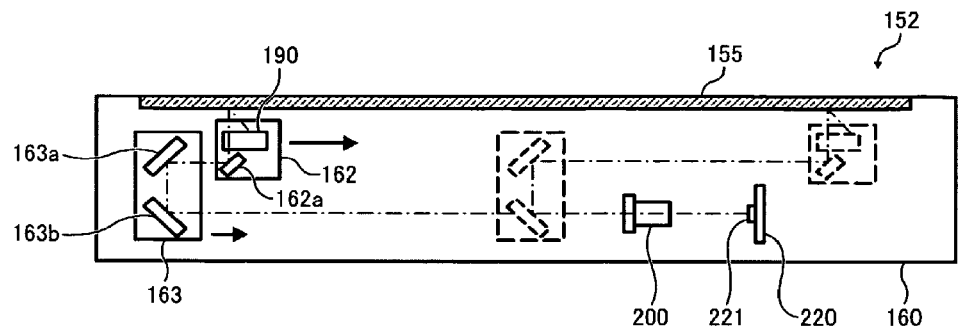
FIG. 3 is an enlarged schematic view of the image reading device of FIG. 2 as viewed from the side.

With reference to FIGS. 2 and 3, a description is now provided of an internal configuration of the image reading device 150. FIG. 2 is a partially enlarged perspective view of the internal configuration of the image reading device 150 as viewed from an oblique angle. FIG. 3 is an enlarged schematic view of the internal configuration of the image reading device 150 as viewed from the side.

Inside a housing 160 (shown in FIG. 3) of the image reading device 150, the first carriage 162 and the second carriage 163 are disposed. The first carriage 162 and the second carriage 163 are integrally movable. The first carriage 162 includes a first mirror 162a and a light projection unit 190 serving as a light projector. The second carriage 163 includes a second mirror 163a and a third mirror 163b.

Although not illustrated, two first rails made of metal are fixed inside the housing 160 of the image reading device 150.

The first rails are spaced at a certain distance in the short side direction and extend in the longitudinal direction. The first carriage 162 is laid across the two first rails so that the first carriage 162 can travel in the longitudinal direction on the first rails.

Although not illustrated, two second rails made of metal are fixed vertically below the first rails. The two second rails are spaced at a certain distance in the short side direction of the housing 160. The second carriage 163 is laid across the second rails so that the second carriage 163 can travel in the longitudinal direction on the second rails.

A plate beam 164 made of metal is fixed to the housing 160. A lens unit 210 is supported by the plate beam 164. The lens unit 210 includes an imaging lens 200 screw-fixed to the upper surface of the plate beam 164 and an image reading substrate 220 serving as an electric circuit substrate equipped with a CCD 221 serving as an imaging device.

As illustrated in FIG. 2, at the upper right of the image reading device 150, a drive motor 170 is provided. A drive timing pulley 172 is fixed to a rotary shaft of a driven gear 171 that engages the drive gear of the drive motor 170.

A driven timing pulley 174 is fixed to one end of a rotary shaft 173. A drive timing belt 175 is wound around and stretched between the drive timing pulley 172 and the driven timing pulley 174.

Substantially near both ends of the rotary shaft 173, first pulleys 180 are fixed. At the left of FIG. 2, Two second pulleys 181 are rotatably supported at one end side of the housing 160 in the longitudinal direction and spaced at a certain distance in the short side direction. Each of first timing belts 182 is wound around and stretched between the first pulley 180 and the second pulley 181.

The second carriage 163 includes the second mirror 163a, the third mirror 163b, a pair of mirror stays 163c that supports both ends of the third mirror 163b in the main scanning direction, arm members 163d extending to the first carriage 162.

Third pulleys 183 are rotatably supported at a surface of the mirror stays 163c facing the housing side surface. Each tip portion of the arm members 163d is provided with a bracket 163e. A pair of fourth pulleys 184 is rotatably supported by the brackets 163e. Each of the second timing belts 185 is wound around and stretched between the third pulley 183 and the fourth pulley 184. A portion of the second timing belt 185 is fixed to the bottom portion of the housing 160 by a fixing member, not illustrated.

The first timing belts 182 and the second timing belts 185 are fixed to the bottom portion of the first carriage 162.

When an image reading operation is initiated, the light projection unit 190 projects light against the document, not illustrated. The drive motor 170 is activated and the rotation force of the drive motor 170 is transmitted to the rotary shaft 173 through the drive timing belt 175, thereby rotating the rotary shaft 173. As the rotary shaft 173 rotates, the pair of the first timing belts 182 rotates in the clockwise direction in FIG. 2, causing the first carriage 162 fixed to the pair of the first timing belts 182 to move from the left to the right.

When the first carriage 162 moves, the second timing belts 185 fixed to the first carriage 162 move to the right. Because a portion of the second timing belt 185 is fixed to the bottom of the housing 160, the second timing belts 185 rotate while the second carriage 163 moves to the right in FIG. 2.

The diameter of the third and the fourth pulleys 183 and 184 is twice as much as the diameter of the first and the second pulleys 180 and 181. Therefore, the second carriage 163 moves to the right at half speed of the first carriage 162. The second carriage 163 moves in the same direction as the first carriage 162 at half speed so that the length of the light paths of a light flux from the document surface to the imaging lens 200 does not change.

A controller controls the drive motor 170 in accordance with a request signal from a host computer requesting reading an image for each line. Accordingly, a moving speed of the first carriage 162 and the second carriage 163 is controlled.

While the first carriage 162 and the second carriage 163 move from the left to the right at a speed ratio of 2:1, light projected from the light projection unit 190 is reflected on a target, that is, the document placed on a contact glass 155 shown in FIG. 3.

An optical image obtained from the reflection is directed to the imaging lens 200 through the first mirror 162a, the second mirror 163a, and the third mirror 163c. Then, the optical image is imaged on the CCD 221 serving as the imaging device.

The CCD 221 photoelectrically converts the imaged optical image from the document and outputs an analogue image signal as a read image.

When the first carriage 162 and the second carriage 163 move to the position indicated by dotted lines in FIG. 3, the document reading operation is finished and the first carriage 162 and the second carriage 163 return to a home position indicated by a real line.

The analogue image signal output from the CCD 221 is converted to a digital image signal by an analogue/digital converter and then subjected to various image processing such as binarization, multi-value conversion, gradation, magnification, and editing using the circuit substrate including an image processing circuit.

Figure 4:
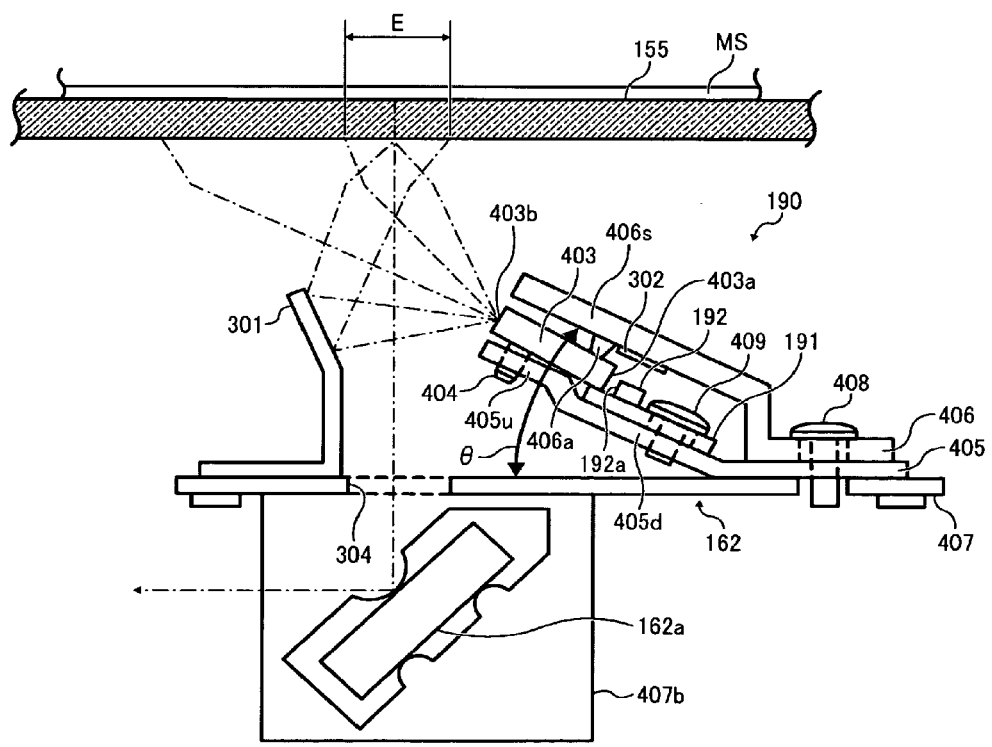
FIG. 4 is an enlarged schematic view near a first carriage of the image reading device.

Referring now to FIG. 4, there is provided an enlarged schematic view near the first carriage 162. As illustrated in FIG. 4, the first carriage 162 includes a base 407 and a pair of side plates 407b. The base 407 is formed of a flat sheet metal. The pair of the side plates 407b is disposed hanging from the base 407 and spaced at a certain distance in the main scanning direction (sheet surface direction). The first mirror 162a is disposed between the pair of the side plates 407b. It is to be noted that one of the side plates 407b is shown in FIG. 4.

The light projection unit 190 is attached to the base 407. The light projection unit 190 includes a mounting table 405 serving as a holding member, an LED array substrate 191, a light guiding plate 403 serving as a light guide, and a cover 406. A plurality of LEDs 192 is disposed in array on the LED array substrate 191.

The mounting table 405 is formed of a sheet metal having relatively good heat dissipation and bent at a predetermined angle. The mounting table 405 includes an attachment portion including an attachment surface that is attached to the base 407, and a slant surface portion. A predetermined angle is formed between the slant surface portion and the base 407.

The slant surface portion of the mounting table 405 includes a step portion in a sub-scanning direction. The step portion consists of an upper step 405u and a lower step 405d such that the space between the lower step 405d and the cover 406 is greater than the space between the upper step 405u and the cover 406. The upper step 405u and the lower step 405d are substantially parallel with each other.

The light guiding plate 403 serving as the light guide is positioned on the upper step 405u of the mounting table 405. The light guiding plate 403 is formed of resin such as acrylic having high transmissivity and has a substantially flat rectangular shape in the main scanning direction.

Figure 6:
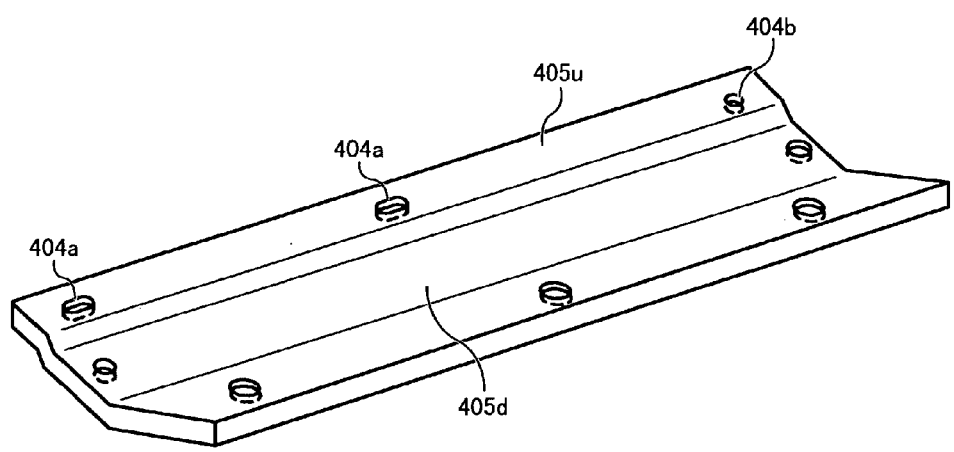
FIG. 6 is a perspective schematic view of the light projection unit.

According to the present illustrative embodiment, three positioning pins 404 (protruding portions) serving as a first positioning portion integrally formed (molded) with the light guiding plate 403 are inserted into three through holes including two through holes 404a and one through hole 404b (shown in FIG. 6) both serving as a second positioning portion that penetrate through the mounting table 405. The positioning pins 404 and the through holes 404a and 404b serve as a light guiding plate positioning portion.

The three positioning pins 404 are formed on the bottom surface of the light guiding plate 403 at a center and at both ends thereof in a longitudinal direction.

A planar circuit substrate (hereinafter referred to as an LED array substrate) 191 is attached to the lower step 405d of the mounting table 405 by screws 409. As illustrated in FIG. 4, the screws 409 are provided substantially at the attachment side of the cover 406 that is substantially at the right side in FIG. 4. The screws 409 fix both ends of the LED array substrate 191 in the main scanning direction.

In terms of securing a proper amount of light and prevention of irregularity in the light amount in the main scanning direction as well as in terms of assembly, the screws 409 are used to align and fix the LED array substrate 191. However, a fixing method is not limited to using the screws 409. Alternatively, LEDs 192 may abut the light guiding plate 403, or a jig such as a spacer may be used.

A plurality of side-view type LEDs 192 is attached to the LED array substrate 191 in the main scanning direction. When the LED array substrate 191 is driven, light is projected from a light emitting surface 192a (the left end surface of the LED 192 in FIG. 4) to an incident surface 403a (the right end surface of the light guiding plate 403 in FIG. 4).

Furthermore, using total reflection of the light guiding plate 403, light is projected evenly from the light emitting surface 403b (the left end surface of the light guiding plate 403) to a reflector 301 as well as the contact glass 155. In this case, the positioning pins 404 are disposed between the centers of light emission of the LEDs 192 so that the positioning pins 404 do not face the LEDs 192.

As illustrated in FIG. 4, the cover 406 is attached to the base 407 by a plurality of screws 408, thereby preventing the cover 406 from deforming (warping) at the place other than both ends thereof due to heat generated by the LED array substrate 191. In particular, the center portion of the cover 406 is prevented from rising.

Figure 5:
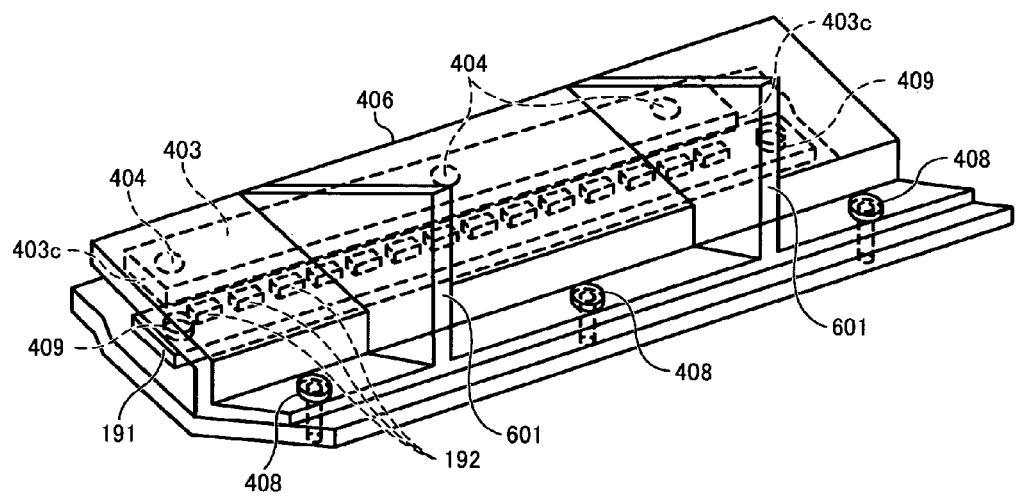
FIG. 5 is a perspective schematic view of a light projection unit of the image reading device.

The cover 406 includes an attachment portion including screw holes through which the screws for fastening the cover 406 on the base 407 are inserted, a slant surface 406s forming a predetermined angle θ with the base 407, and a plurality of strengthening ribs 601 (shown in FIG. 5) serving as strengthening members that enhance stiffness of the cover 406. FIG. 5 is a perspective view of the light projection unit 190.

In this case, the attachment portion of the cover 406 has a substantially L-shape in cross section in the sub-scanning direction. The plurality of strengthening ribs 601 are formed substantially vertical relative to the main scanning direction and arranged in the sub-scanning direction.

Furthermore, projections 406a are integrally formed with the bottom surface of the slant surface 406s of the cover 406. The projections 406a are formed at the center of the cover 406 and at both ends of the cover 406 in the longitudinal direction or the main scanning direction. Three projections 406a are provided substantially at the incident surface 403a side from the center of the light guiding plate 403 in the sub-scanning direction and contact the top surface of the light guiding plate 403.

In order to prevent the three projections 406a from absorbing the light incident upon the light guiding plate 403, the three projections 406a are provided between the LEDs 192 so as not to face the LEDs 192.

It is to be noted that the shape of the contact surfaces of the three projections 406a is not limited to the configuration described above. Any shapes, for example, a rectangular shape or a circular shape that are easily molded, can be used.

The cover 406 may be formed of light shielding material including, for example, a polyester film and PET material including black carbon having high light density through which light does not easily penetrate. Accordingly, the cover 406 prevents light from leaking to the right side in the sub-scanning direction relative to an illumination area E of the contact glass 155 shown in FIG. 4, that is, in the direction of the first carriage 162 moving in the sub-scanning direction of the document.

Alternatively, the cover 406 may be formed of material having good heat conduction such as metal. In such a case, the heat emitted from the plurality of LEDs 192 can be released more efficiently, thereby minimizing a temperature difference between the LEDs 192.

A reflector 302 is provided on the bottom surface of the cover 406 facing the LEDs 192 and the light guiding plate 403 along the main scanning direction. The end surface of the reflector 302 extending in the main scanning direction is in close contact with three projections 406a.

The height of the step of the mounting table 405 is formed such that there is a slight gap between the bottom surface of the light guiding plate 403 and the LED array substrate 191.

The incident surface side of the light guiding plate 403 faces the LED array substrate 191. The three projections 406a of the cover 406 press the incident surface side of the top surface of the light guiding plate 403 facing the LED array substrate 191 downward (toward the LED substrate side). Consequently, the light guiding plate 403 is rotated about the end portion (the right side) of the upper step 405u in the clockwise direction by the projections 406a, thereby causing the incident surface side of the light guiding plate 403 to press the LED array substrate 191 toward the lower step 405d of the mounting table 405.

As the light guiding plate 403 rotates, the positioning pins 404 remain fitted with the through holes 404a and 404b at the light emitting surface side of the light guiding plate 403. In other words, the height of the upper step 405u from the end portion of the LED substrate side (at the right side in FIG. 4) to the top surface of the LED array substrate 191 is configured so as to prevent the positioning pins 404 from getting disengaged from the through holes 404a and 404b when the light guiding plate 403 rotates.

With this configuration, even if the top surface of the light guiding plate 403 at the incident surface side is pressed by the projections 406a causing the light guiding plate 403 to turn, the light guiding plate 403 is still properly positioned in both the sub-scanning direction and the main scanning direction.

When both sides of the LED array substrate 191 are fixed by the screws 409, the center of the LED array substrate 191 deforms due to heat generated by the LED array substrate 191. In particular, the center of the LED array substrate 191 rises. When such deformation occurs, the light emitting surface 192a of the LEDS 192 is misaligned with the incident surface 403a of the light guiding plate 403, causing irregularity in the amount of light in the main scanning direction.

To address such a difficulty, according to the illustrative embodiment of the present invention, the incident surface side of the light guiding plate 403 presses the portion of the LED array substrate 191 substantially near the LED array along the main scanning direction.

With this configuration, the LED array substrate 191 is prevented from rising, and thus the LED array substrate 191 remains in contact with the mounting table 405 along the main scanning direction. Because the mounting table 405 and the base 407 are formed of sheet metal, heat generated from the LED array substrate 191 is dissipated through thermal conduction, preventing deformation of the LED array substrate 191.

Furthermore, the light guiding plate 403 is pressed against the LED array substrate 191 by the projections 406a of the cover 406. Accordingly, the positional relation of the LED array and the light guiding plate 403 relative to the LED substrate in the vertical direction is stabilized, and irregularity in the light mount in the main scanning direction can be prevented. Further, the light emitting surface 192a of the LEDs 192 on the LED array substrate 191 can reliably face the incident surface 403a of the light guiding plate 403.

According to the illustrative embodiment, the light guiding plate 403 is fixed such that a portion of the light guiding plate 403 is raised from the upper step 405u of the mounting table 405. As a result, the light guiding plate 403 does not contact any other parts except the following: the upper surface of the light guiding plate 403 contacting projections 406a; the bottom surface of the light guiding plate 403 contacting the portion of the upper step 405u (the end portion of the upper step 405u of the mounting table 405 at the right in FIG. 4) and overlapping with the portion of the LED array substrate 191; and the portion of the light guiding plate 403 contacting the through holes 404a and 404b for the positioning pins 404.

Because the light guiding plate 403 does not contact any other parts except the portions described above, the light projected from the LEDs 192 is prevented from getting absorbed by other parts. With this configuration, the projected light from the LEDs 192 is directed toward the contact glass 155 while being reflected (totally reflected) in the light guiding plate 403.

The angle θ between the slant surface 406s of the cover 406 and the base 407 shown by an arrow in FIG. 4 is substantially smaller than the angle between the mounting table 405 and the base 407. Therefore, the slant surface portion of the mounting table 405 and the slant surface 406s of the cover 406 are not parallel with each other. Rather, the angle between the slant surface portion of the mounting table 405 and the slant surface 406s of the cover 406 is reduced toward the light projecting direction. The pressure from the cover 406 is concentrated on the projections 406a of the slant surface 406s, thereby reliably pressing the light guiding plate 403 and the LED array substrate 191.

The area of the light emitting surface 192a of the LED of the LED array substrate 191 is smaller than the incident surface 403a of the light guiding plate 403. That is, the height of the light emitting surface 192a is shorter than the incident surface 403a. The LEDs 192 and the light guiding plate 403 are spaced at a certain distance in the sub-scanning direction.

It is to be noted that in order to use the total reflection of the light guiding plate 403, the LEDS 192 is disposed in the vicinity of the side surfaces 403c (except the incident surface and the light emitting surface) of the light guiding plate 403.

Since the area of the incident surface 403a of the light guiding plate 403 is substantially larger than the light emitting surface 192a, the projected light in a wide angle can reliably incident upon the incident surface 403a. Further, the shape of the light guiding plate 403 is rectangular that is suitable for total reflection. That is, the light guiding plate 403 is substantially long in the light guiding direction. Accordingly, while the light incident upon the light guiding plate 403 is reflected in the light guiding plate 403 and advances therethrough, the light has an appropriate luminous intensity distribution.

The LEDS 192 and the light guiding plate 403 are spaced apart, thereby preventing the LEDS 192 and the light guiding plate 403 from contacting each other and getting damaged due to variation in the LEDs 192.

The first carriage 162 includes the reflector 301 serving as a reflection member. The reflector 301 faces the light emitting surface 403b of the light guiding plate 403 sandwiched between the mounting table 405 and the cover 406. The upper portion of the reflector 301 is bent to a return side of the first carriage 162 in the sub-scanning direction, that is, the return direction of the first carriage 162 so as to direct the projected light from the light guiding plate 403 to the contact glass 155.

The projected light from the light guiding plate 403 is reflected at the bent portion of the upper portion of the reflector 301 so that even if the document includes asperities on the surface thereon, for example, even if the surface of the document includes cut-out pieces that are pasted thereon thereby producing undesirable shades, the shades are eliminated by the reflection.

The projected light from the LEDs 192 incidents upon the incident surface 403a of the light guiding plate 403 and is reflected (totally reflected) on the top and the bottom surfaces as well as the side surfaces of the light guiding plate 403 while advancing through the light guiding plate 403. Then, the light is projected from the light emitting surface 403b of the light guiding plate 403 against the reflector 301 and the illumination area E of the contact glass 155.

The light projected to the reflector 301 is reflected by the reflector 301 such that the projected light illuminates the illumination area E of the contact glass 155. The illumination area E extends in the sub-scanning direction of the document.

As illustrated in FIG. 4, the base 407 includes an opening 304 through which the reflected light from the document incidents upon the first mirror 162a.

Figure 7:
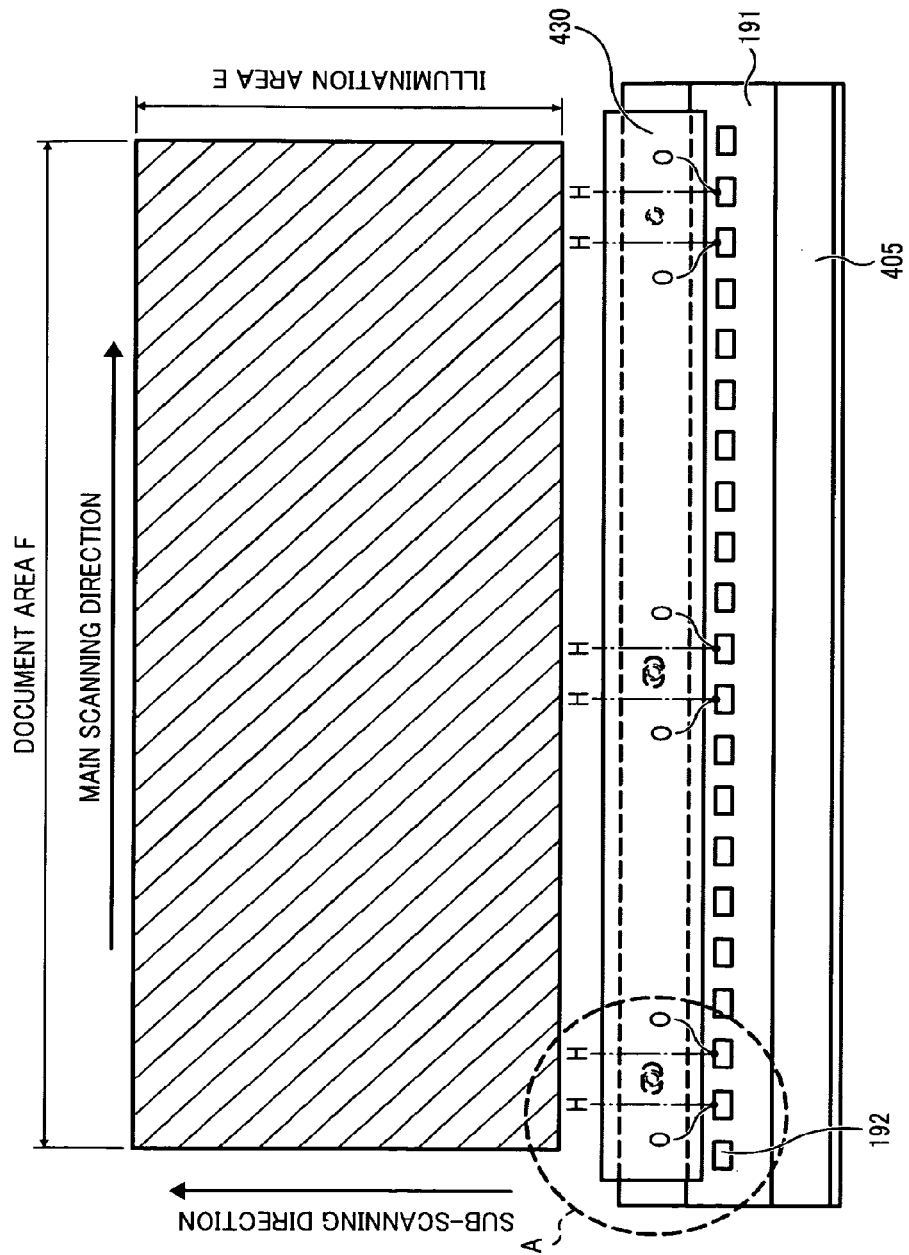
FIG. 7 is a schematic diagram illustrating a positional relation of a light guiding plate of the light projection unit, LEDs, and a document area.
Figure 8:
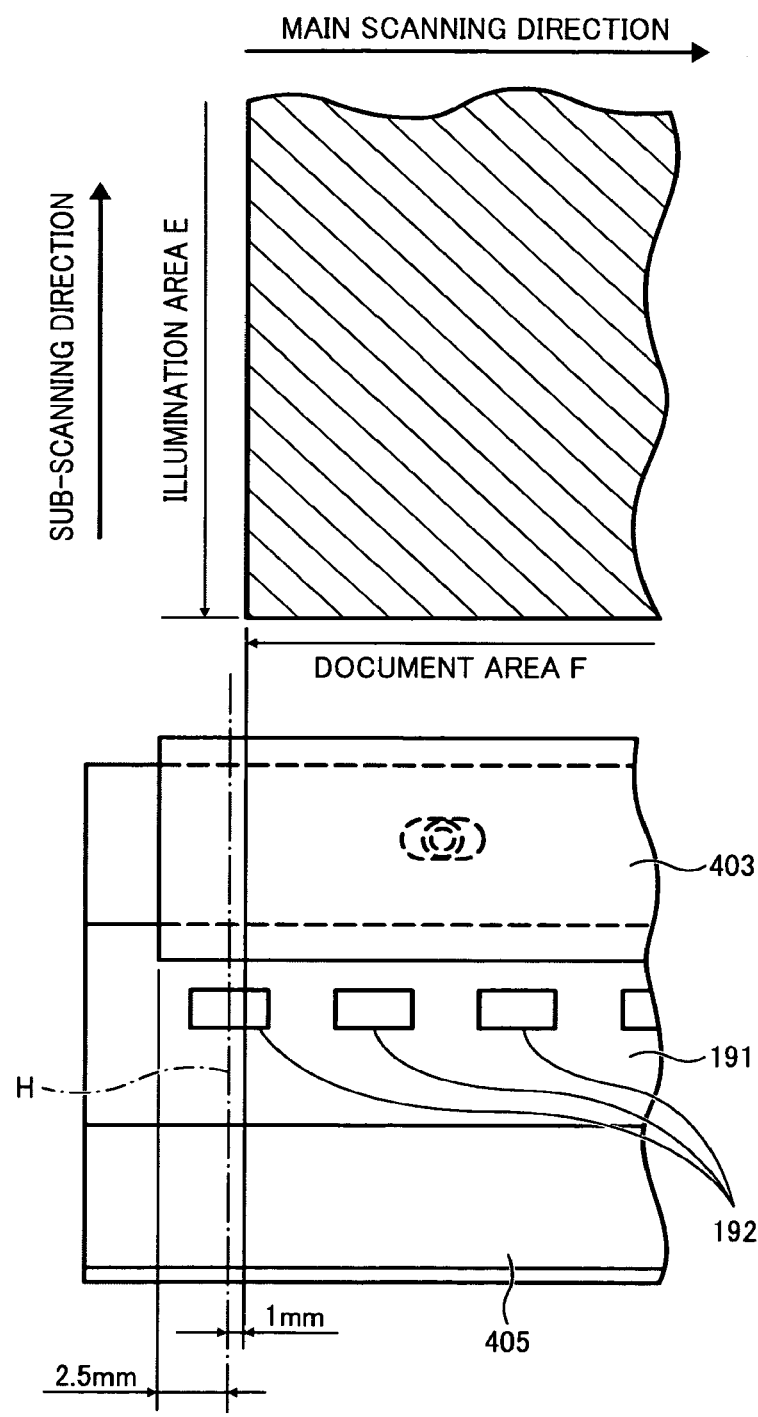
FIG. 8 is an enlarged schematic diagram illustrating a portion indicated by a broken-line circle A of FIG. 7.

With reference to FIGS. 7 and 8, a description is provided of a positional relation of the light guiding plate 403, the LEDs 192, and the document area F. FIG. 7 is a schematic diagram illustrating the light guiding plate 403, the LEDs 192, and the document area F. FIG. 8 is a partially enlarged schematic diagram of FIG. 7.

The document area F extends in the main scanning direction of the document. As illustrated in FIG. 7, the length of the light guiding plate 403 and the LED array substrate 191 is longer than the document area F. As illustrated in FIG. 8, the center O of light emission of the LEDs 192 at the end portions in the main scanning direction is positioned 1 mm outside the edge of the document area F in the main scanning direction. The edge of the light guiding plate 403 is positioned 2.5 mm outside the edge of the document area F in the main scanning direction.

Figure 17:
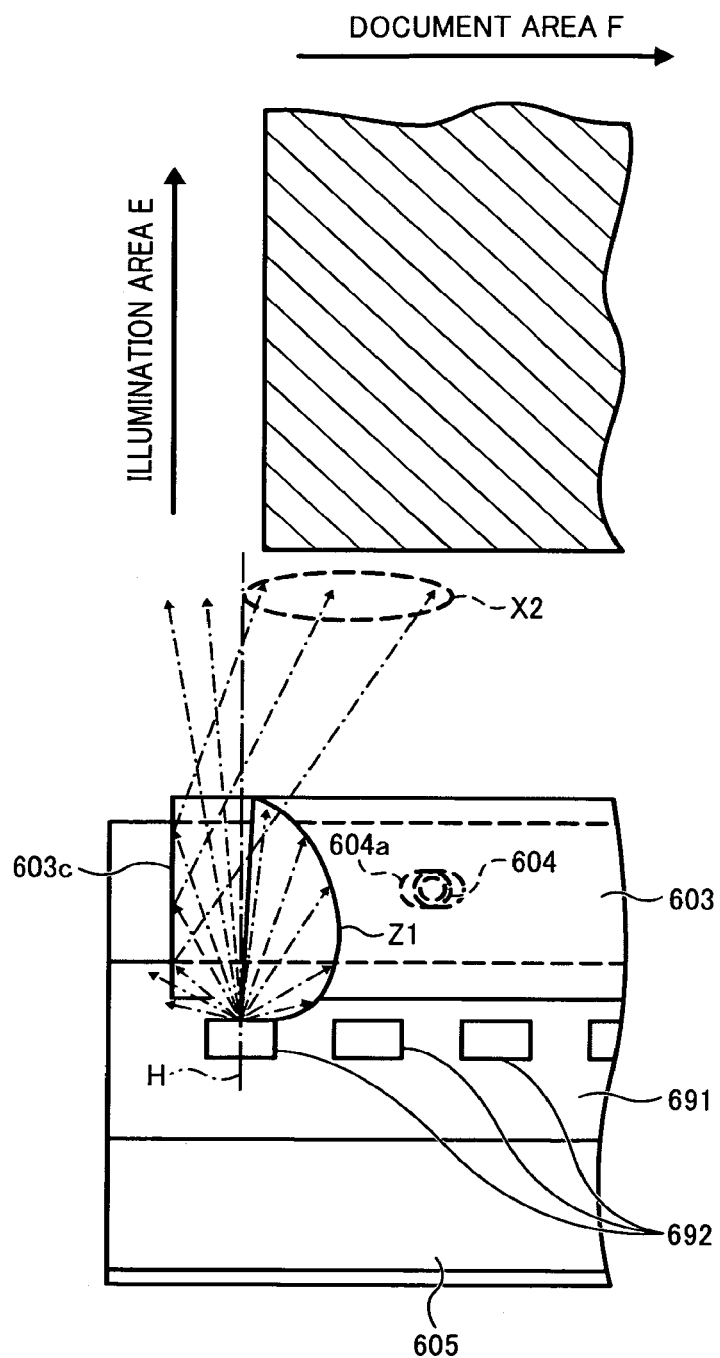
FIG. 17 is an explanatory schematic diagram illustrating optical paths at the edge portion of the light guiding plate which is slightly longer than a document area in the main scanning direction.

As illustrated in FIG. 7, the length of the light guiding plate 403 is similar to, if not the same as that of the document area F. Therefore, as will be shown in FIG. 17, of the light projected from the LEDs 192 and incident upon the light guiding plate 403, that part of the light heading outside the document area F is totally reflected on the side surface 403c of the light guiding plate 403, and then directed to the document area F as indicated by a broken-line circle X2.

With this configuration, in addition to the projected light directed toward the document area indicated by Z1, the light totally reflected on the side surface 403c of the light guiding plate 403 indicated by X2 also illuminates the document area. Accordingly, enough light is secured at the end portion of the document area F, thereby preventing a decrease in illuminance at the end portion of the document area F.

Next, a description is provided of positioning of the positioning pins 404 of the light guiding plate 403.

Figure 9:
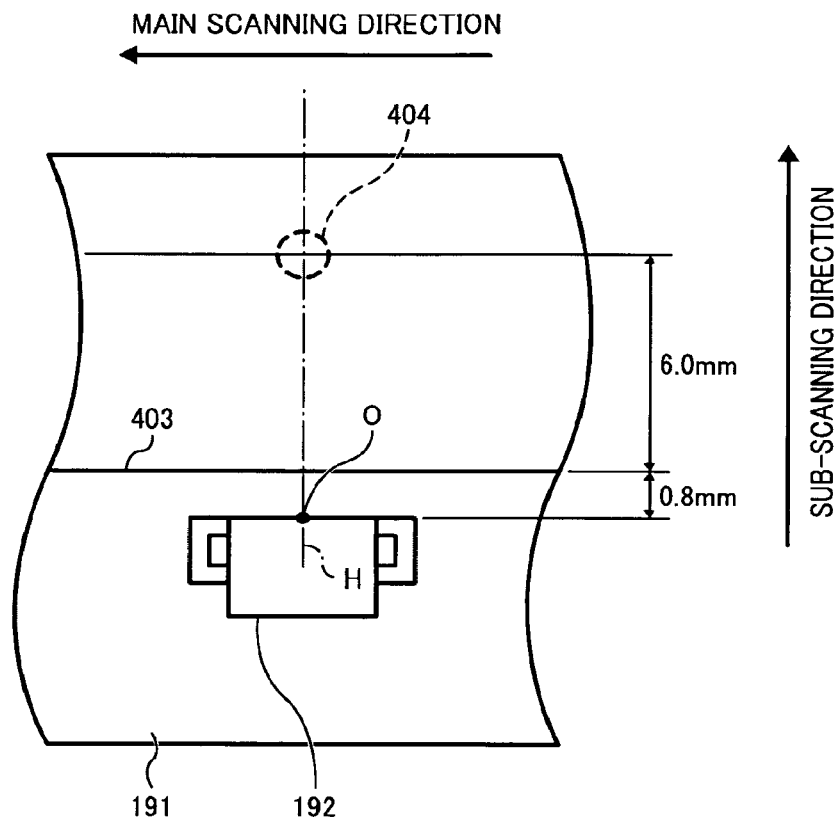
FIG. 9 is a partially enlarged schematic diagram illustrating a positioning pin of the light guiding plate located substantially at the center of light emission of the LEDs.

Referring now to FIG. 9, there is provided a partially enlarged schematic diagram illustrating one of the positioning pins 404 of the light guiding plate 403 located at the center of light emission of the LED 192. With reference to FIG. 9, a description is provided of an experiment performed by the present inventor.

In the light projection unit, each of the positioning pins 404 (φ 2.0 [mm]) of the light guiding plate 403 (refraction index: 1.49, thickness: 3 [mm]) were positioned on a center line H of light emission of the LED 192. The center line H herein refers to a perpendicular line from the center O of light emission of the light emitting surface 192a. If the light emitting surface has a curved surface, the center line H is a normal line. The document reading unit 50 employed in the experiment included the light projection unit described above. A white reference plate was read.

It is to be noted that the distance between the positioning pins 404 and the incident surface 403a was 6.0 [mm], and the distance between the light emitting surface 192a and the incident surface 403a of the light guiding plate 403 was 0.8 [mm].

Figure 10:
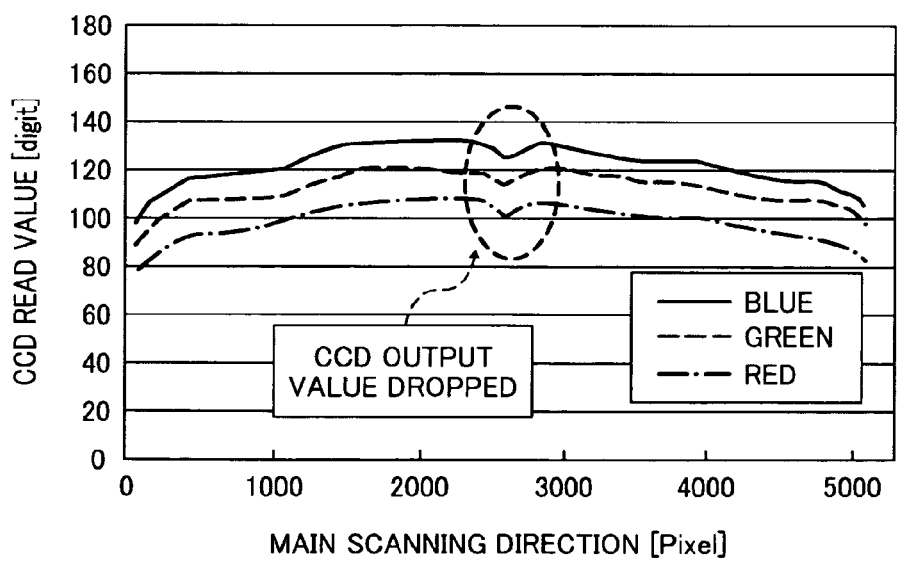
FIG. 10 is a graph showing output values of CCDs in the main scanning direction when each of the positioning pins of the light guiding plate is located at the center of light emission of the LEDs.

FIG. 10 shows output values of CCDs in the main scanning direction. As can be understood from FIG. 10, each of the positioning pins 404 of the light guiding plate 403 was substantially at the center in the main scanning direction (near 2700-Pixel), and the output values of the CCDs for each color blue, green, and red at this position were partially dropped as indicated by a dotted oval.

Figure 11:
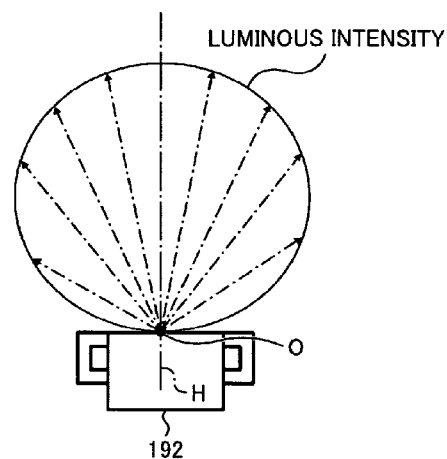
FIG. 11 is an explanatory diagram for explaining light emission characteristics of the LEDs.

Referring now to FIG. 11, there is provided an explanatory diagram for explaining the light emission characteristics of the LED 192. FIG. 11 illustrates luminous intensity characteristics of the LED 192. In FIG. 11, the luminous intensity at certain points from the light emitting surface 192a of the LED 192 is shown.

In FIG. 11, a horizontal axis represents an angle (hereinafter referred to as a viewing angle) between a straight line (in the illumination direction) from the center O of light emission of the light emitting surface 192a and each point. The luminous intensity at each point is plotted on the vertical axis.

As can be understood from FIG. 11, of light projected from the LEDs 192, the light in the center line direction of light emission, that is, the light having the viewing angle of zero, has the luminous intensity substantially similar to the greatest luminous intensity. As the viewing angle increases, the ratio of decrease in the luminous intensity increases.

In other words, the light having a relatively small viewing angle has the luminous intensity substantially similar to the maximum intensity. By contrast, the light having a relatively large viewing angle has luminous intensity significantly less than the maximum intensity of light emission.

When each of the positioning pins 404 (first positioning portion) is provided on a normal line of the center of the light emission of the light emitting surface, the luminous distribution in the main scanning direction is significantly irregular. However, providing the positioning pins 404 between the centers of the light emission of the adjacent LEDs (light emitting elements) in the main scanning direction can prevent irregular luminous distribution in the main scanning direction on the document.

The light in the normal line direction of the center of light emission of the light emitting surface has the greatest luminous intensity. On the other hand, as the angle relative to the normal line increases, the luminous intensity decreases. If the positioning pins 404 are provided on the center line H, the light having almost no viewing angle relative to the normal line of the center of light emission incidents upon the positioning pins 404. In this case, the light incident upon the positioning pins 404 has the strong luminous intensity. Consequently, the amount of light that leaks from the positioning pins 404 increases, and the amount of light that is on the light path from the incident surface of the light guiding plate toward the positioning pins 404 significantly decreases when the light is projected from the light guiding plate 403.

Therefore, when each of the positioning pins 404 is positioned on the center line H of the light emission of the LED 192, this means that the positioning pins 404 are on the light path of the light having the strong intensity. As a result, the light having the strongest intensity incidents upon the positioning pins 404.

Since it is difficult to give a mirror finish to the positioning pins 404 and an angle for total reflection is difficult to obtain between the positioning pins 404 and the light incident upon the positioning pins 404, the light leaks from the positioning pins 404. Furthermore, the light incident upon the positioning pins 404 is absorbed by the contact portion of the mounting table 405 contacting the positioning pins 404.

As a result, the amount of light projected from the light emitting surface 403b of the light guiding plate 403 on the center line H significantly decreases. This is why the output values of the CCDs for each color dropped at the position (near 2700-pixel) where the positioning pins 404 are disposed as illustrated in FIG. 10.

By contrast, when each of the positioning pins 404 is disposed between the centers O of light emission of the adjacent LEDs 192, the amount of light leaking from the positioning pins 404 can be minimized.

Figure 12:
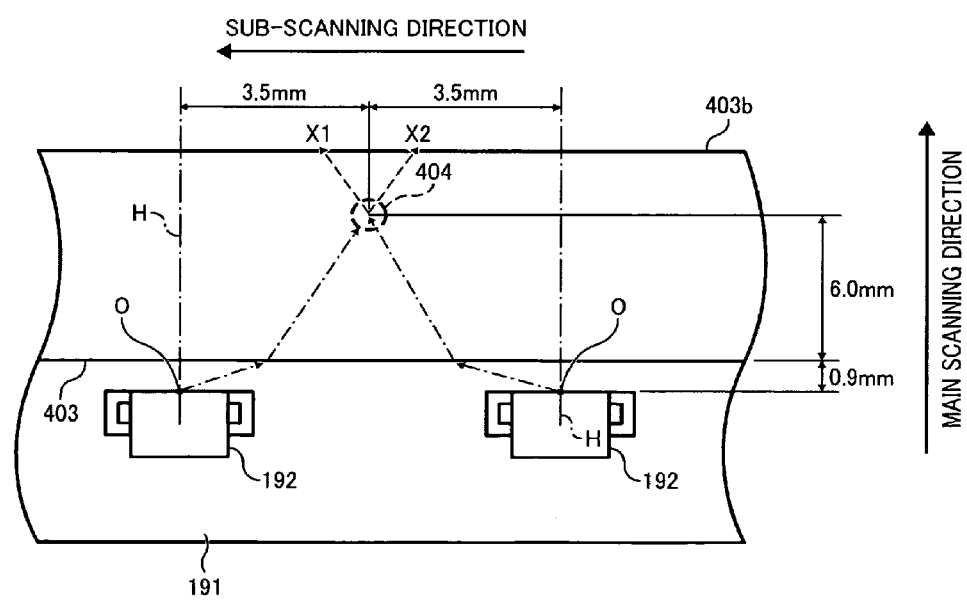
FIG. 12 is an enlarged schematic diagram illustrating the positioning pin located between the centers of light emission of the adjacent LEDs.

Referring now to FIG. 12, there is provided an enlarged schematic diagram illustrating the positioning pin 404 located between the centers of light emission of the adjacent LEDs 192. With reference to FIG. 12, a description will be now provided of an experiment performed by the present inventor.

In the light projection unit 190, each of the positioning pins 404 (φ 2.0 [mm]) of the light guiding plate 403 (refraction index: 1.49, thickness: 3 [mm]) was positioned between the center lines H of light emission of the adjacent LEDs 192. The document reading unit 50 included the light projection unit 190, and the white reference plate was read.

It is to be noted that the distance between the center of light emission of the LEDs 192 is 7.0 [mm], the distance between the positioning pin 404 and the incident surface 403a of the light guiding plate 403 was 6.0 [mm], and the distance between the light emitting surface 192a and the incident surface 403a of the light guiding plate 403 was 0.9 [mm].

Figure 13:
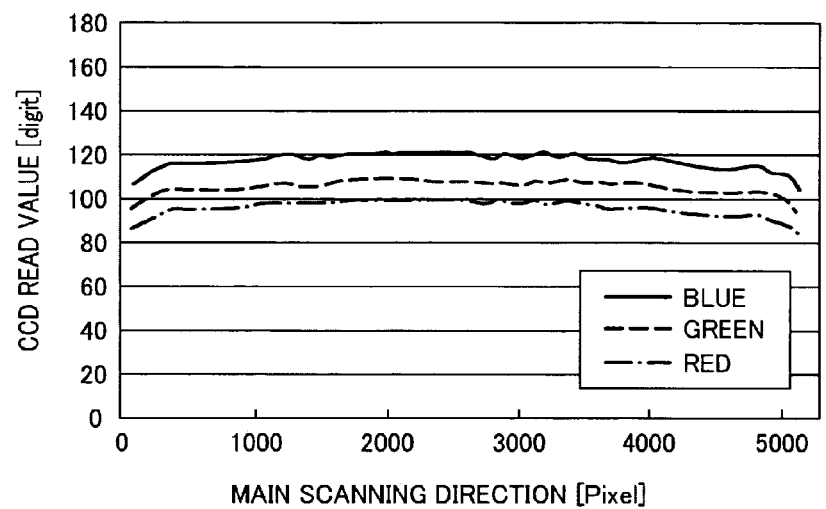
FIG. 13 is a graph showing output values of CCDs in the main scanning direction when each of the positioning pins of the light guiding plate is located between the centers of light emission of the adjacent LEDs.

The output values of the CCDs in the main scanning direction are shown in FIG. 13. The positioning pin 404 is located substantially near 3000-pixel. As can be understood from FIG. 13, the output values of the CCDs for each color did not drop, even partially.

This is because, as illustrated in FIG. 12, when each of the positioning pins 404 is disposed between the centers O of light emission of the adjacent LEDs 192, the light incident upon the positioning pins 404 has a relatively large viewing angle. Consequently, the light having relatively low intensity incidents upon the positioning pins 404 as compared with the light having a zero-viewing angle as illustrated in FIG. 11.

As a result, when the ratio of light incident upon the positioning pins 404 each of which positioned on the center line H of light emission of all the totally reflected light toward the positioning pins 404 as illustrated in FIG. 9 and the ratio of light incident upon the positioning pins 404 each of which disposed between the centers O of all the totally reflected light toward the positioning pins 404 are substantially the same, the amount of light that leaks from or absorbed by the positioning pins 404 is significantly less when the positioning pins 404 are positioned between the centers O of light emission.

The light having a low luminous intensity tends to leak from the positioning pins 404. Thus, the amount of decrease in the amount of light projected from X1 and X2 of the light emitting surface 403*b* of the light guiding plate 403 is less compared with a case in which the positioning pins 404 are provided in the center of light emission. Therefore, the present inventor believes that the output value of the CCDs for each color did not partially drop when each of the positioning pins 404 is disposed between the centers O of light emission of the LEDs 192.

In view of the above, when each of the positioning pins 404 is disposed between the adjacent LEDs 192, the amount of light that leaks from the positioning pins 404 can be minimized, thereby preventing an adverse effect on the output value of the CCDs in the main scanning direction. In particular, irregular luminous intensity distribution in the main scanning direction can be prevented.

Figure 14:
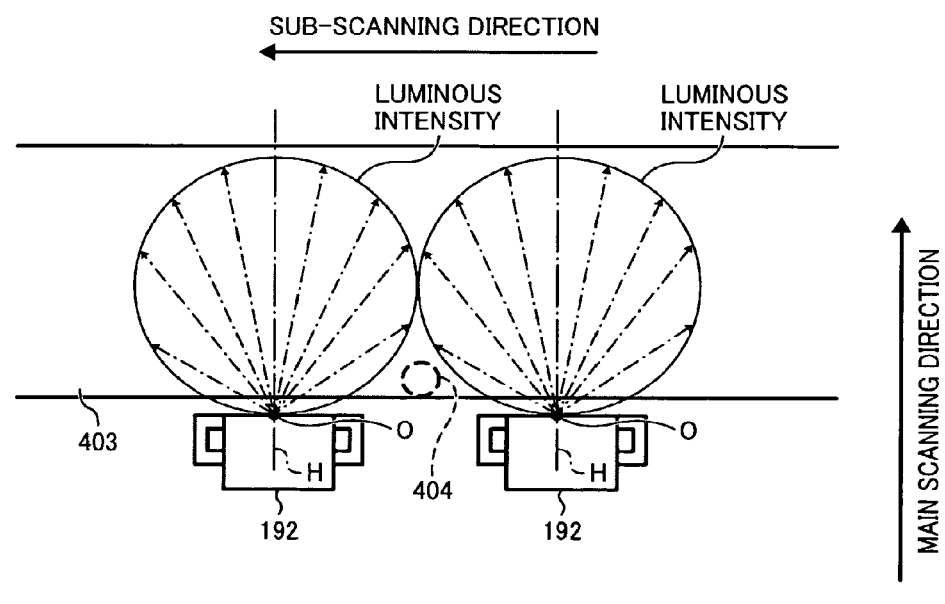
FIG. 14 is a partially enlarged schematic diagram illustrating each of the positioning pins disposed between the centers of light emission of the adjacent LEDs while the positioning pins are at the nearest position to the LEDs in the sub-scanning direction.
Figure 15:
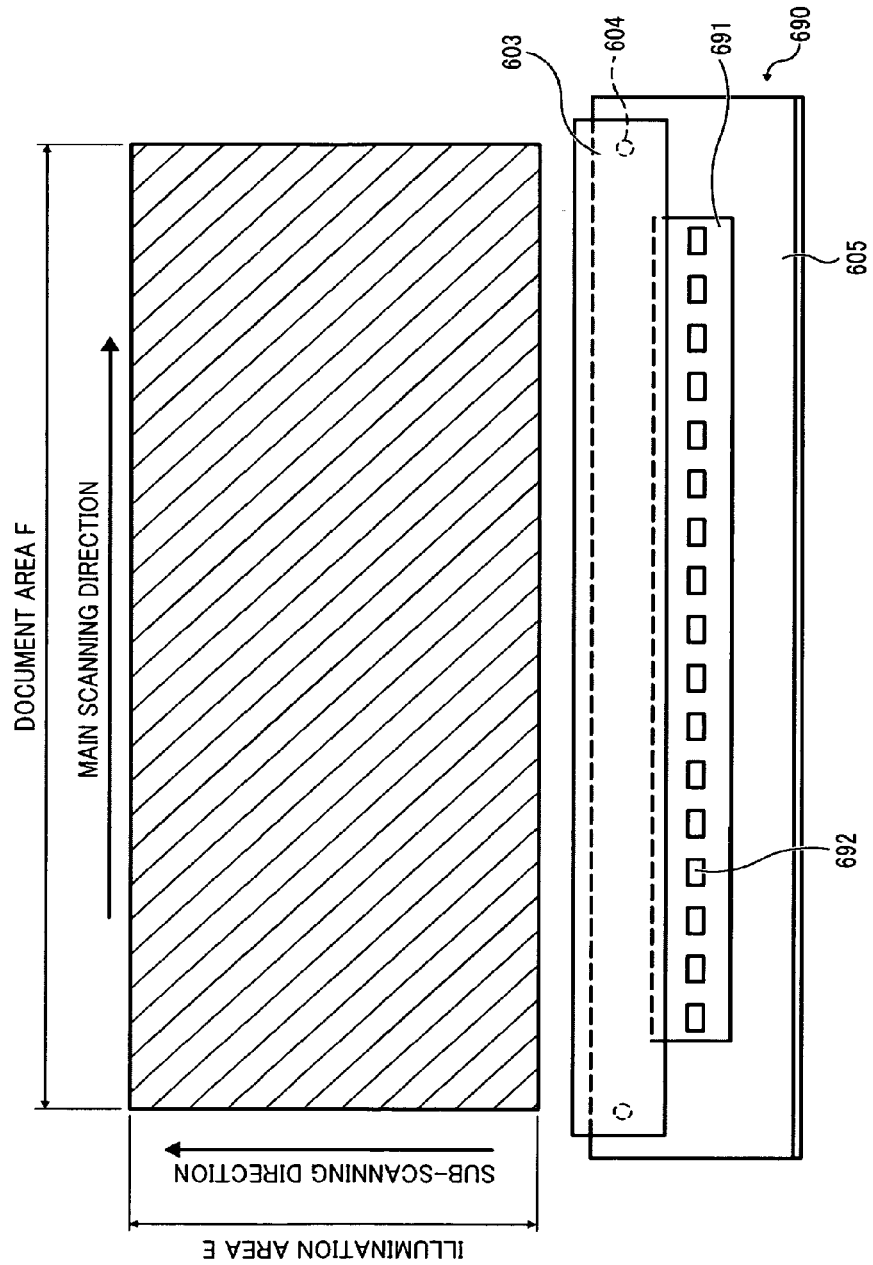
FIG. 15 is a schematic diagram illustrating a related-art light projection unit.
Figure 16:
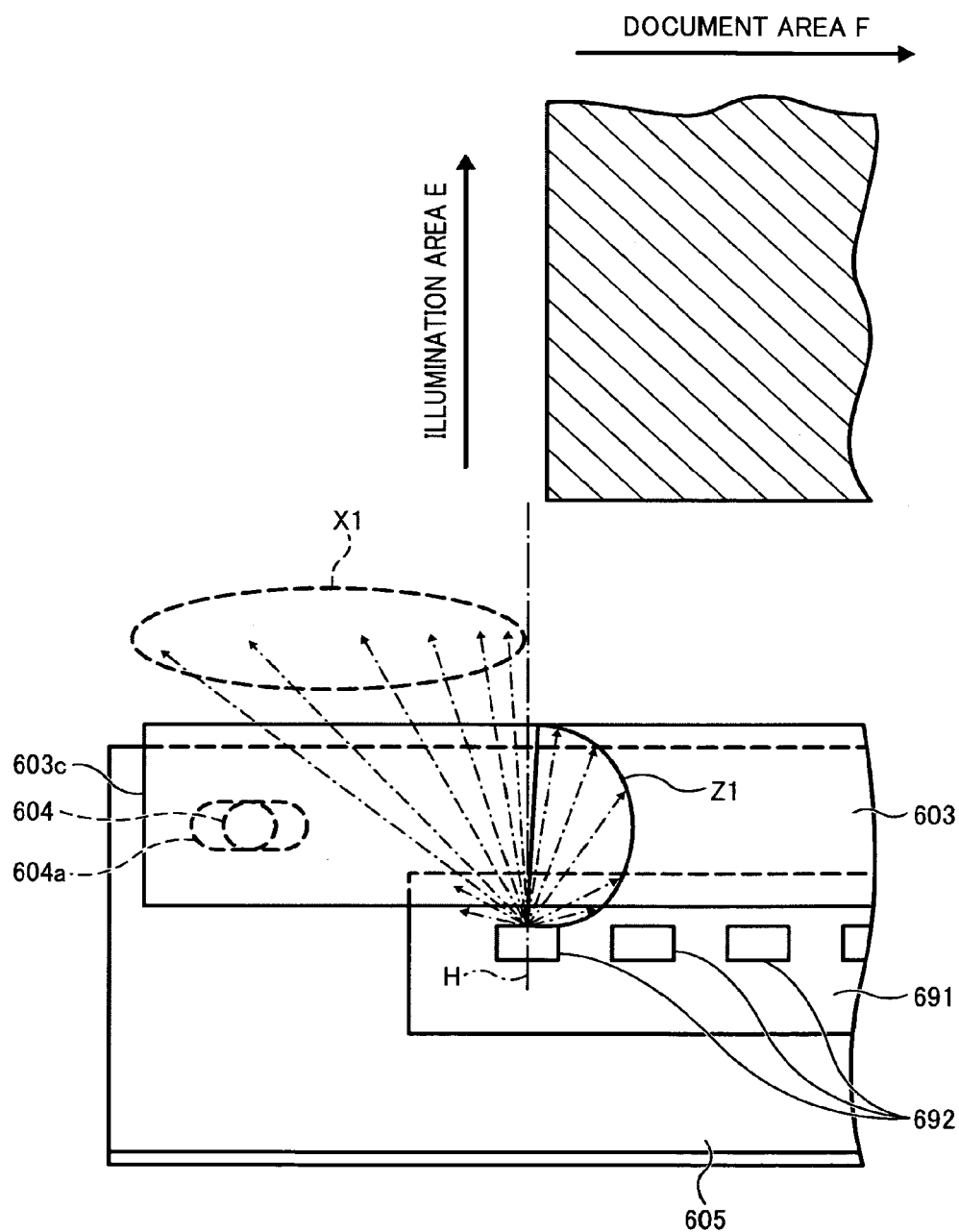
FIG. 16 is an explanatory schematic diagram for explaining light paths of projected light in the related-art light projection unit.

As explained with reference to FIG. 11, as the viewing angle is large, the luminous intensity of the LEDs 192 decreases. Thus, as illustrated in FIG. 14, the positioning pins 404 of the light guiding plate 403 can be disposed in the center between the centers O of light emission of the adjacent LED 192 in the main scanning direction while the positioning pins 404 are disposed at the nearest position to the LEDs 192 in the sub-scanning direction.

With this configuration, the intensity of light incident upon the positioning pins 404 is at the weakest. Even if light leaks from the positioning pins 404, the amount of leakage is not significant, thereby preventing irregularity in the luminous intensity distribution.

According to the illustrative embodiment, the side-view type LEDs 192 having the light emitting surface 192*a* perpendicular to the surface of the LED array substrate 191 serving as a light emitting element are used. Alternatively, top-view type LEDs having the light emitting surface parallel to the surface of the LED array substrate can be used.

According to the illustrative embodiment, the light guiding plate 403 is positioned on the mounting table 405 by fitting the positioning pins 404 into the through holes 404*a* and 404*b* of the mounting table 405 on which the LED array substrate 191 is held. The positioning pins 404 are provided such that the positioning pins 404 come between the centers O of light emission of the adjacent LEDs 192 in the main scanning direction of the LED array substrate 191.

With this configuration, the luminous intensity distribution in the main scanning direction on the document surface is prevented from getting uneven when compared with providing each of the positioning pins 404 on the center line H of light emission of the LEDs 192.

Furthermore, the positioning pins 404 are disposed within the document area so that the length of the light guiding plate 403 is substantially the same length of the document area. Accordingly, the light reflected from the side surfaces 403*c* of the light guiding plate 403 can be directed to the document area, thereby preventing the illuminance at the edge portions of the document area from decreasing.

According to the illustrative embodiment, the positioning pins 404 are fitted into the through holes 404*a* and 404*b* of the mounting table 405 such that the positioning pins 404 come in the center between the center O of the light emission of the adjacent LEDs 192 in the main scanning direction while the positioning pins 404 are substantially near the LEDs 192 in the sub-scanning direction. With this configuration, the intensity of light incident upon the positioning pins 404 is at the weakest, and even if light leaks from the positioning pins 404, the amount of leaked light is not significant, thereby preventing an irregular luminous intensity distribution.

According to the illustrative embodiment, the present invention is employed in the image forming apparatus. By employing the light projection unit that illuminates light against the document in the scanner serving as an image reading unit, an irregular luminous distribution of in the main scanning direction on the document surface is prevented, thereby enhancing accuracy in reading an image.

The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A light projection unit, comprising:
a substrate;
a plurality of light emitting elements arrayed on the substrate in a main scanning direction, each of the light emitting elements including a light emitting surface to project light;
a light guide disposed facing the light emitting surfaces of the light emitting elements, to direct light projected from the light emitting elements onto an illumination area of an illumination target, the light guide including a first positioning portion; and
a holder including a second positioning portion to engage the first positioning portion of the light guide, to position the light guide on the holder,
the first positioning portion of the light guide being positioned between centers of light emission of adjacent light emitting elements in the main scanning direction of the substrate when the first positioning portion engages the second positioning portion of the holder, the first positioning portion includes a projection, and the second positioning portion includes a concave portion.

2. The light projection unit according to claim 1, wherein, when the first positioning portion of the light guide engages the second positioning portion of the holder, the first positioning portion is positioned between the centers of light emission of adjacent light emitting elements substantially at a light emitting element side.

3. The light projection unit according to claim 1, further comprising a cover configured to cover the substrate and the light guide and configured to fix the light guide in place, the light emitting elements being attached to the substrate such that the light emitting surfaces of the light emitting elements are perpendicular to the substrate, the holder further including a first surface on which the substrate is held, a second surface facing the light guide, and a step portion provided between the first surface and the second surface, such that when the substrate is held on the first surface, the second surface is closer to the light guide than to the substrate, and the light emitting element side of the light guide being positioned on the holder facing the substrate, and the cover being configured to cover the substrate held by the holder and the light guide positioned relative to the holder and configured to contact and press the light emitting element side of the light guide against the substrate to fix the light guide in place.

4. An image reading unit, comprising:

the light projection unit of claim 1; and an image reading device to receive the reflected light from the document to read an image on the surface thereof.

5. An image forming apparatus, comprising:

the image reading unit of claim 4; and an image forming device, the image forming device including an image bearing member to bear an electrostatic latent image on a surface thereof;

a developing device to develop the electrostatic latent image formed on the image bearing member using toner to form a toner image;

a transfer device to transfer the toner image onto the recording medium; and a fixing device to fix the toner image, the image forming apparatus forming the image with the image forming device based on image information read by the image reading device.

6. The light projection unit according to claim 1, wherein the first positioning portion is disposed between a light incident surface and a light emitting surface of the light guide.

7. The light projection unit according to claim 1, comprising a plurality of pairs of the first and second positioning portions, the first positioning portion of at least one of the pairs of first and second positioning portions including the projection, and the second positioning portion of at least one of the pairs of first and second positioning portions including the concave portion.

8. The light projection unit according to claim 7, comprising a plurality of pairs of the first and second positioning portions, the first positioning portion of all of the pairs of first and second positioning portions including the projection, and the second positioning portion of all of the pairs of first and second positioning portions including the concave portion.

9. The light projection unit according to claim 1, comprising a plurality of pairs of the first and second positioning portions, the first positioning portion of at least one of the pairs of first and second positioning portions being disposed between a light incident surface and a light emitting surface of the light guide.

10. The light projection unit according to claim 1, comprising a plurality of pairs of the first and second positioning portions, the first positioning portion of at least one of the pairs of first and second positioning portions including the projection, and the second positioning portion of at least one of the pairs of first and second positioning portions including the concave portion, and the first positioning portion of at least one of the pairs of first and second positioning portions being disposed between a light incident surface and a light emitting surface of the light guide.

* * * * *